US012649697B2

(12) United States Patent
Linck et al.

(10) Patent No.: US 12,649,697 B2
(45) Date of Patent: Jun. 9, 2026

(54) SHAPE FORMING OPF PREFORM

(71) Applicant: GOODRICH CORPORATION, Charlotte, NC (US)

(72) Inventors: John S. Linck, Pueblo, CO (US); Christopher C. Koroly, Spring Valley, CA (US); Kirk Christopher Newton, Vail, AZ (US); Vijay V. Pujar, San Diego, CA (US); Paul T. Perea, Pueblo West, CO (US); James W. Rudolph, Colorado Springs, CO (US); Christopher T. Kirkpatrick, Pueblo West, CO (US); Katherine E. Waugh, Easton, CT (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 17/832,459

(22) Filed: Jun. 3, 2022

(65) Prior Publication Data

US 2022/0402828 A1      Dec. 22, 2022

Related U.S. Application Data

(60) Provisional application No. 63/212,264, filed on Jun. 18, 2021.

(51) Int. Cl.
*C04B 35/83* (2006.01)
*C04B 35/628* (2006.01)

(52) U.S. Cl.
CPC ........ *C04B 35/83* (2013.01); *C04B 35/62873* (2013.01); *C04B 35/62884* (2013.01);
(Continued)

(58) Field of Classification Search
CPC ....... B29B 11/12; B29C 70/541; B29C 33/12; B29C 33/38; B29C 2043/3665; C04B 35/83
See application file for complete search history.

(56) References Cited

U.S. PATENT DOCUMENTS 1,394,558 A    10/1921  Klug
1,916,435 A     7/1933  Ott et al.
(Continued)

FOREIGN PATENT DOCUMENTS

DE        4234002 A1 *  4/1994    ........... B29C 33/485
DE        4234002        6/1995
(Continued)

OTHER PUBLICATIONS

Fujita, Akihiro, Hiroyuki Hamada, and Zenichiro Maekawa. "Tensile Properties of Carbon Fiber Triaxial Woven Fabric Composites." Journal of composite materials 27.15 (1993): 1428-1442. Web (Year: 1993).*
(Continued)

*Primary Examiner* — Susan D Leong
*Assistant Examiner* — Timothy G Hemingway
(74) *Attorney, Agent, or Firm* — SNELL & WILMER L.L.P.

(57) ABSTRACT

A method for manufacturing a C/C part includes fabricating an oxidized PAN fiber preform comprising a stack of sheets of multi-axial, non-crimp, OPF fabric. The method includes positioning the oxidized PAN fiber preform with a female forming tool, the female forming tool comprising a die recess, and forming the oxidized PAN fiber preform into a shaped body. The shaped body is removed from the female forming tool and moved into a graphite fixture for carbonization. The carbonized shaped body may also be densified into the final C/C part. The carbonized shaped body can also (Continued)

be placed in a perforated graphite fixture for densification and removed from the perforated graphite fixture between densification processes for machining and for facilitating further densification.

20 Claims, 10 Drawing Sheets

(52) U.S. Cl.
  CPC .. *C04B 35/62894* (2013.01); *C04B 2235/422* (2013.01); *C04B 2235/5212* (2013.01); *C04B 2235/5248* (2013.01); *C04B 2235/5252* (2013.01); *C04B 2235/5256* (2013.01); *C04B 2235/602* (2013.01); *C04B 2235/612* (2013.01); *C04B 2235/614* (2013.01)

(56) References Cited

U.S. PATENT DOCUMENTS

| | | | | |
|---|---|---|---|---|
| 3,708,451 | A * | 1/1973 | McWhorter | C08L 71/14 |
| | | | | 106/284 |
| 3,813,094 | A | 5/1974 | Walton et al. | |
| 4,396,663 | A | 8/1983 | Mitchell et al. | |
| 4,847,063 | A | 7/1989 | Smith et al. | |
| 5,433,937 | A | 7/1995 | Sohda et al. | |
| 6,183,583 | B1 | 2/2001 | Duval et al. | |
| 6,489,027 | B1 * | 12/2002 | Kondo | C30B 15/10 |
| | | | | 428/408 |
| 6,812,171 | B2 | 11/2004 | Shimazaki et al. | |
| 7,198,739 | B2 | 4/2007 | La Forest et al. | |
| 7,223,376 | B2 | 5/2007 | Panter et al. | |
| 7,429,172 | B2 | 9/2008 | Chotard | |
| 7,622,066 | B2 | 11/2009 | Brustad et al. | |
| 8,673,188 | B2 | 3/2014 | Linck et al. | |
| 8,864,073 | B1 | 10/2014 | Kim et al. | |
| 9,017,761 | B2 | 4/2015 | La Forest et al. | |
| 9,028,947 | B2 | 5/2015 | Tompkins et al. | |
| 9,216,523 | B2 | 12/2015 | Monforte, II et al. | |
| 9,259,859 | B2 | 2/2016 | Blackburn et al. | |
| 9,546,438 | B2 | 1/2017 | Fiala | |
| 9,638,048 | B2 * | 5/2017 | Measom | B64C 27/473 |
| 9,873,231 | B2 | 1/2018 | Le Costaouec | |
| 10,011,534 | B2 * | 7/2018 | Hipp | B29B 11/16 |
| 10,427,807 | B1 | 10/2019 | Stackpoole et al. | |
| 10,457,016 | B2 | 10/2019 | La Forest et al. | |
| 10,746,246 | B2 | 8/2020 | Fryska et al. | |
| 2003/0168555 | A1 | 9/2003 | Livi et al. | |
| 2004/0115300 | A1 | 6/2004 | Zuffa | |
| 2005/0093188 | A1 * | 5/2005 | Forest | F16D 69/023 |
| | | | | 264/29.1 |
| 2006/0073338 | A1 | 4/2006 | Simpson et al. | |
| 2006/0108056 | A1 | 5/2006 | Starr | |
| 2008/0292739 | A1 * | 11/2008 | Kashikar | C03C 25/328 |
| | | | | 428/394 |
| 2010/0074979 | A1 * | 3/2010 | Cundiff | B29C 70/541 |
| | | | | 425/112 |
| 2010/0136292 | A1 | 6/2010 | Lucas | |
| 2011/0143140 | A1 * | 6/2011 | Pham | B29C 70/44 |
| | | | | 156/60 |
| 2015/0008617 | A1 | 1/2015 | Graf | |
| 2016/0236454 | A1 | 8/2016 | Potts | |
| 2016/0332917 | A1 | 11/2016 | Hipp et al. | |
| 2017/0008266 | A1 | 1/2017 | Humfeld et al. | |
| 2017/0268102 | A1 * | 9/2017 | She | C23C 16/4557 |
| 2018/0326627 | A1 | 11/2018 | Ichiki et al. | |
| 2019/0134848 | A1 | 5/2019 | Podgorski et al. | |
| 2019/0240876 | A1 | 8/2019 | Lee et al. | |
| 2020/0094447 | A1 | 3/2020 | Blaney | |
| 2020/0282669 | A1 | 9/2020 | Wade et al. | |
| 2020/0346419 | A1 | 11/2020 | Rigamonti | |
| 2020/0398460 | A1 | 12/2020 | Davidson et al. | |
| 2021/0102590 | A1 * | 4/2021 | Shula | F16D 69/023 |
| 2021/0187787 | A1 | 6/2021 | Cebolla Garrofe | |
| 2022/0063174 | A1 | 3/2022 | Arahata | |

FOREIGN PATENT DOCUMENTS

| | | | | |
|---|---|---|---|---|
| DE | 102012024060 | 6/2014 | | |
| DE | 202016100796 | 5/2017 | | |
| DE | 102016101610 | 8/2017 | | |
| EP | 770155 | 7/2000 | | |
| EP | 2225093 | 1/2012 | | |
| EP | 3308930 A1 * | 4/2018 | .......... | B29C 33/306 |
| EP | 3211362 | 1/2021 | | |
| FR | 2871092 | 12/2005 | | |
| GB | 1265552 | 3/1972 | | |
| GB | 2535193 | 8/2016 | | |
| JP | H03223177 | 10/1991 | | |
| JP | 2008115048 | 5/2008 | | |
| JP | 2016043507 | 4/2016 | | |
| KR | 100730775 | 6/2007 | | |
| WO | 2005070642 | 8/2005 | | |
| WO | 2019012242 | 1/2019 | | |
| WO | 2020138340 | 7/2020 | | |

OTHER PUBLICATIONS

European Patent Office, European Partial Search Report dated Nov. 18, 2022 in Application No. 22179948.9.

European Patent Office, European Search Report dated Oct. 31, 2022 in Application No. 22179944.8.

European Patent Office, European Search Report dated Nov. 17, 2022 in Application No. 22179985.1.

European Patent Office, European Search Report dated Oct. 27, 2022 in Application No. 22179728.5.

European Patent Office, European Search Report dated Feb. 20, 2023 in Application No. 22179948.9.

USPTO; Requirement for Restriction dated Mar. 14, 2023 in U.S. Appl. No. 17/832,485.

USPTO; Requirement for Restriction dated Jul. 19, 2023 in U.S. Appl. No. 17/832,403.

USPTO; Requirement for Restriction dated Jun. 14, 2023 in U.S. Appl. No. 17/832,426.

USPTO; Non-Final Office Action dated Jul. 19, 2023 in U.S. Appl. No. 17/832,485.

USPTO; Non-Final Office Action dated Oct. 25, 2023 in U.S. Appl. No. 17/832,403.

USPTO; Non-Final Office Action dated Oct. 25, 2023 in U.S. Appl. No. 17/832,426.

USPTO; Final Office Action dated Nov. 15, 2023 in U.S. Appl. No. 17/832,485.

USPTO; Final Office Action dated Feb. 14, 2024 in U.S. Appl. No. 17/832,403.

USPTO; Non-Final Office Action dated May 1, 2024 in U.S. Appl. No. 17/832,485.

USPTO; Advisory Action dated Apr. 23, 2024 in U.S. Appl. No. 17/832,403.

USPTO; Non-Final Office Action dated Jul. 1, 2024 in U.S. Appl. No. 17/832,403.

USPTO; Non-Final Office Action dated Sep. 11, 2024 in U.S. Appl. No. 17/832,485.

USPTO; Final Office Action dated Nov. 19, 2024 in U.S. Appl. No. 17/832,403.

USPTO; Non-Final Office Action dated Dec. 10, 2024 in U.S. Appl. No. 18/643,933.

USPTO; Advisory Action dated Jan. 27, 2025 in U.S. Appl. No. 17/832,403.

USPTO; Final Office Action dated Feb. 3, 2025 in U.S. Appl. No. 17/832,485.

USPTO; Non-Final Office Action dated Mar. 12, 2025 in U.S. Appl. No. 17/832,403.

USPTO; Advisory Action dated Apr. 9, 2025 in U.S. Appl. No. 17/832,485.

USPTO; Final Office Action dated Apr. 9, 2025 in U.S. Appl. No. 18/643,933.

USPTO; Advisory Action dated Jun. 23, 2025 in U.S. Appl. No. 18/643,933.

(56)          References Cited

OTHER PUBLICATIONS

USPTO; Final Office Action dated Jul. 7, 2025 in U.S. Appl. No. 17/832,403.

European Patent Office, European Office Action dated Jul. 31, 2025 in Application No. 22179985.1.

European Patent Office, European Office Action dated Jul. 25, 2025 in Application No. 22179944.8.

USPTO; Non-Final Office Action dated Aug. 6, 2025 in U.S. Appl. No. 18/643,933.

USPTO; Advisory Action dated Sep. 11, 2025 in U.S. Appl. No. 17/832,403.

European Patent Office, European Office Action dated Aug. 18, 2025 in Application No. 22179948.9.

USPTO; Notice of Allowance dated Feb. 23, 2024 in U.S. Appl. No. 17/832,426.

USPTO; Advisory Action dated Mar. 6, 2024 in U.S. Appl. No. 17/832,459.

* cited by examiner

400

SHAPE FORMING OPF PREFORM

CROSS REFERENCE TO RELATED APPLICATIONS

This application claims priority to, and the benefit of, U.S. Provisional Patent Application Ser. No. 63/212,264, entitled "SHAPE FORMING NON-WOVEN OPF PREFORM," filed on Jun. 18, 2021. The '264 application is hereby incorporated by reference in its entirety for all purposes.

FIELD

The present disclosure relates to carbon/carbon composites, and more specifically, to systems and methods for manufacturing carbon/carbon (C/C) composites.

BACKGROUND

Composite bodies are utilized in various industries, including the aerospace industry. C/C composites are often produced as 2D structures, for example utilizing planar oxidized polyacrylonitrile (PAN) fiber-based preforms followed by carbonization and chemical vapor infiltration (CVI) densification.

SUMMARY

According to various embodiments, a method for manufacturing a C/C part is disclosed, the method comprising positioning an oxidized PAN fiber preform with a female forming tool, the female forming tool comprising a die recess, and forming the oxidized PAN fiber preform into a shaped body. The forming comprises moving a first member at least partially into the die recess, the oxidized PAN fiber preform disposed between the first member and the female forming tool, and compressing the oxidized PAN fiber preform between the first member and the female forming tool, thereby increasing a fiber volume ratio of the oxidized PAN fiber preform.

In various embodiments, the method further comprises applying a sizing agent to the oxidized PAN fiber preform prior to the oxidized PAN fiber preform being formed into the shaped body. In various embodiments, the sizing agent comprises at least one of water, polyvinyl alcohols, modified starch, carboxymethyl cellulose, modified wax and acrylates or mixtures of these.

In various embodiments, the method further comprises applying heat to the oxidized PAN fiber preform for a predetermined duration while the oxidized PAN fiber preform is held in compression in the die recess. In various embodiments, the forming further comprises applying steam for a predetermined duration while the oxidized PAN fiber preform is held in compression in the die recess.

In various embodiments, the method further comprises clamping the oxidized PAN fiber preform between a grip strip and the female forming tool along a periphery of the oxidized PAN fiber preform while the oxidized PAN fiber preform is being compressed between the first member and the female forming tool.

In various embodiments, the method further comprises bending the oxidized PAN fiber preform over a radii surface of the female forming tool, wherein the radii surface forms a rounded, convex surface transition disposed between a sidewall portion of a recess surface at least partially defining the die recess and a first top surface of the female forming tool.

In various embodiments, the first member and the female forming tool are in direct contact with the oxidized PAN fiber preform.

In various embodiments, in response to forming the oxidized PAN fiber preform into the shaped body, a first portion of the oxidized PAN fiber preform is bent at an angle with respect to a second portion of the oxidized PAN fiber preform.

In various embodiments, the angle is between thirty degrees and one hundred and seventy degrees.

In various embodiments, the angle is between forty-five and one hundred and thirty-five degrees.

In various embodiments, the oxidized PAN fiber preform comprises a stack of sheets of non-crimp OPF fabric.

In various embodiments, the method further comprises removing the shaped body from the female forming tool, moving the shaped body into a graphite fixture, and performing a carbonization process on the shaped body while the shaped body is in the graphite fixture.

In various embodiments, the method further comprises placing a dead weight onto the graphite fixture so as to hold the shaped body in compression with the graphite fixture during the carbonization process.

In various embodiments, the method further comprises depositing carbon on and within the shaped body via a first chemical vapor infiltration process.

In various embodiments, the method further comprises removing the shaped body from the graphite fixture, moving the shaped body into a perforated graphite fixture, performing the first chemical vapor infiltration process on the shaped body while the shaped body is in the perforated graphite fixture, removing the shaped body from the perforated graphite fixture, and performing a second chemical vapor infiltration process on the shaped body.

In various embodiments, the method further comprises machining a surface of the shaped body between the first chemical vapor infiltration process and the second chemical vapor infiltration process.

In various embodiments, the method further comprises fabricating the oxidized PAN fiber preform from a first sheet of a multi-axial, non-crimp, OPF fabric and a second sheet of the multi-axial, non-crimp, OPF fabric, wherein the first sheet is stacked and needled together with the second sheet to form the oxidized PAN fiber preform.

In various embodiments, the first sheet comprises at least one of a triaxial-tow or a quad-tow, the first sheet comprises a first plurality of fibers extending along a longitudinal direction, a second plurality of fibers oriented at a first angle with respect to the longitudinal direction, and a third plurality of fibers oriented at a second angle with respect to the longitudinal direction, wherein the first angle and the second angle are between twenty degrees and seventy degrees.

In various embodiments, the first angle is equal to the second angle, and the second plurality of fibers intersect the third plurality of fibers in a crisscross pattern.

A method for manufacturing a C/C part is disclosed, the method comprising fabricating an oxidized PAN fiber preform comprising a planar stack of sheets of OPF fabric, positioning the oxidized PAN fiber preform with a female forming tool, the female forming tool comprising a die recess, forming the oxidized PAN fiber preform into a shaped body, removing the shaped body from the female forming tool, moving the shaped body into a graphite fixture, performing a carbonization process on the shaped body while the shaped body is in the graphite fixture, and depositing carbon on and within the shaped body via a chemical vapor infiltration process. The forming comprises moving a first member at least partially into the die recess, the oxidized PAN fiber preform disposed between the first member and the female forming tool, and compressing the oxidized PAN fiber preform between the first member and the female forming tool.

In various embodiments, the forming further comprises applying a sizing agent to the oxidized PAN fiber preform prior to the oxidized PAN fiber preform being formed into the shaped body, wherein the sizing agent comprises at least one of water, polyvinyl alcohol, modified starch, cellulose gum, carboxymethyl cellulose, modified wax, or acrylates.

In various embodiments, the forming further comprises applying at least one of heat or steam to the oxidized PAN fiber preform for a predetermined duration while the oxidized PAN fiber preform is held in compression in the die recess.

In various embodiments, the forming further comprises placing a dead weight onto the first member to hold the oxidized PAN fiber preform in compression in the die recess for the predetermined duration.

In various embodiments, the method further comprises decreasing a gap between the first member and a second member with the dead weight during the predetermined duration.

The foregoing features and elements may be combined in various combinations without exclusivity, unless expressly indicated herein otherwise. These features and elements as well as the operation of the disclosed embodiments will become more apparent in light of the following description and accompanying drawings.

DETAILED DESCRIPTION

Figure 1:
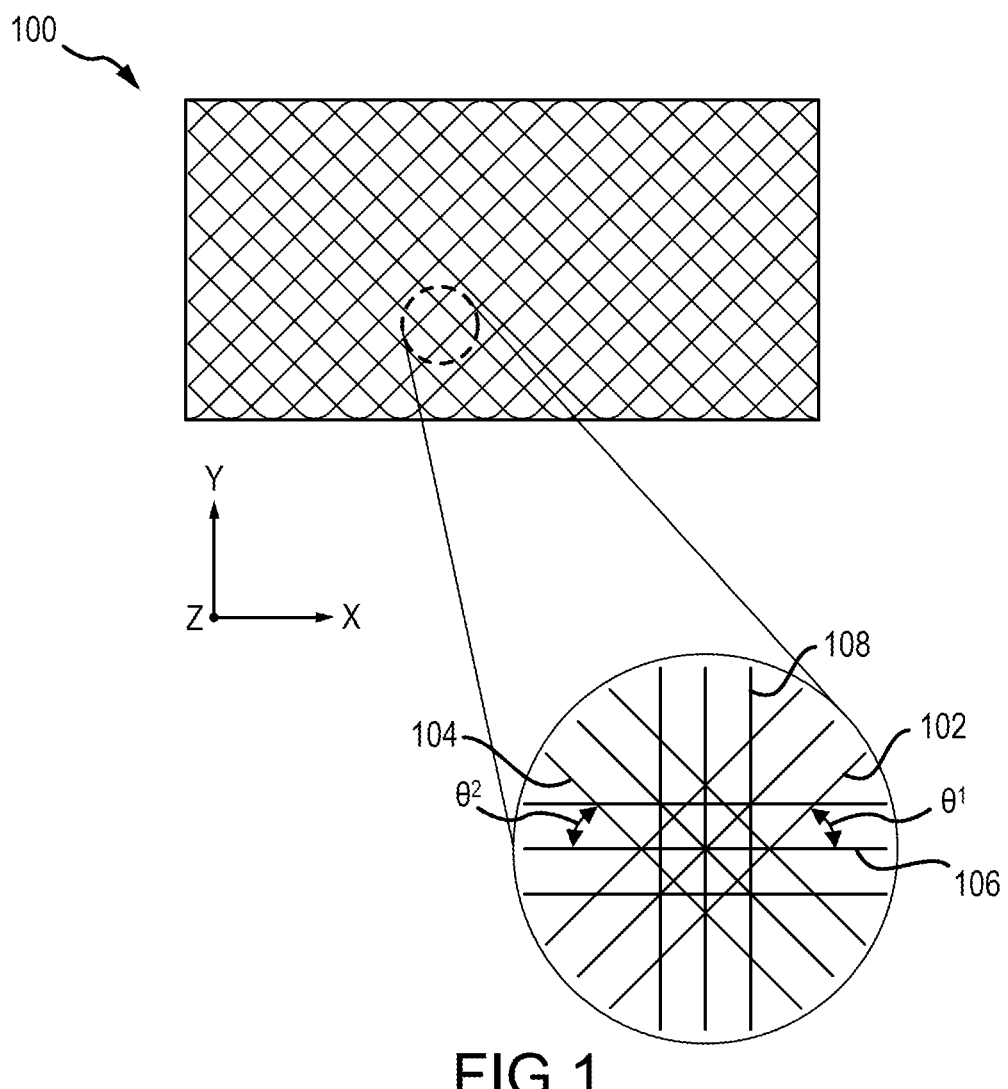
FIG. 1 is a schematic illustration of a multi-axial, non-crimp, OPF fabric, in accordance with various embodiments.

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration and its best mode, and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, the term "CVI/CVD" refers to chemical vapor infiltration and/or chemical vapor deposition. Accordingly, CVI/CVD may refer to chemical vapor infiltration or deposition or both.

As used herein, "fiber volume ratio" means the ratio of the volume of the fibers of the fibrous preform to the total volume of the fibrous preform. For example, a fiber volume ratio of 25% means the volume of the fibers in the fibrous preform is 25% of the total volume of fibrous preform.

As used herein, the term "fiber density" is used with its common technical meaning with units of $g/cm^3$ or g/cc. The fiber density may refer specifically to that of the individual fibers in the fibrous preform. The density will be measured, unless otherwise noted, by taking the weight divided by the geometric volume of each fiber. The density may refer to an average density of a plurality of fibers included in a fibrous preform.

In general, there are currently two primary methods of manufacturing carbon/carbon ("C/C") materials. The first method involves the layup and cure of a carbon fiber, phenolic resin matrix composite, followed by pyrolysis and subsequent phenolic resin infiltration and pyrolysis cycles. Multiple resin infiltration, cure, and pyrolysis cycles are typically used until the part achieves the desired density. The second method involves fabrication of an oxidized polyacrylonitrile fiber (OPF) or carbon fiber preform, followed by carbonization (for OPF preforms) and chemical vapor infiltration (CVI) densification. The chemical vapor infiltration cycles are continued, in conjunction with machining the preform between infiltration cycles if desired, until the desired part density is achieved. Combinations of these two basic process methods are also in use and may include variations in preform architecture, infiltration resin type, and chemical vapor infiltration conditions. A third method may involve a combination of the two aforementioned processes including layup and cure of a carbon fiber, phenolic resin matrix composite, followed by pyrolysis, and CVI densification.

After a fibrous OPF preform (also referred to herein as a fibrous preform) is made, it is carbonized to convert the OPF into carbon fibers. Typically, fibrous preforms are carbonized by placing the preforms in a furnace with an inert atmosphere. As is well-understood, the heat of the furnace causes a chemical conversion which drives off the non-carbon chemical species from the preform. The resulting preform generally has the same fibrous structure as the fibrous preform before carbonizing. However, the OPF have been converted to 100%, or nearly 100%, carbon. After the preform has been carbonized, the preform is densified. In general, densification involves filling the voids, or pores, of the fibrous preform with additional carbon material. This may be done using the same furnace used for carbonization or a different furnace. Typically, chemical vapor infiltration and deposition ("CVI/CVD") techniques are used to densify the porous fibrous preform with a carbon matrix. This commonly involves heating the furnace and the carbonized preforms, and flowing hydrocarbon gases into the furnace and around and through the fibrous preforms. As a result, carbon from the hydrocarbon gases separates from the gases and is deposited on and within the fibrous preforms. When the densification step is completed, the resulting C/C part has a carbon fiber structure with a carbon matrix infiltrating the fiber structure, thereby deriving the name "carbon/carbon".

Carbon/carbon parts ("C/C") of the present disclosure are formed using multi-axial, non-crimp, OPF fabrics that are shape-formed prior to carbonization. Carbon/carbon parts ("C/C") of the present disclosure may be particularly useful for high temperature aerospace applications, such as for re-entry vehicle applications or other high temperature applications such as where a hot gas impinges on the vehicle after being rapidly compressed and heated as a result of a high pressure bow shock in front of the vehicle. C/C parts of the present disclosure may be especially useful in these applications because of the superior high temperature characteristics of C/C material. In particular, the carbon/carbon material used in C/C parts is a good conductor of heat and is able to dissipate heat generated during high temperature conditions. Carbon/carbon material is also highly resistant to heat damage, and thus, may be capable of sustaining forces during severe conditions without mechanical failure.

With reference to FIG. 1, methods for manufacturing a C/C part of the present disclosure include fabrication of an OPF preform using a multi-axial, non-crimp, stich-bonded, OPF fabric 100. Fabric 100 may include a first plurality of fibers 102 oriented at an angle $\theta^1$ with respect to the longitudinal direction (i.e., the lengthwise or X-direction) of the fabric 100. Fabric 100 may further include a second plurality of fibers 104 oriented at an equal but opposite angle $\theta^2$ with respect to the longitudinal direction. Angle $\theta^1$ and angle $\theta^2$ may be between 20 degrees and 70 degrees (20°-70°) in various embodiments, or between 30 degrees and 60 degrees (30°-60°) in various embodiments. In various embodiments, angle $\theta^1$ and angle $\theta^2$ are about 45°, wherein the term "about" in this context can only mean±5°. In various embodiments, angle $\theta^1$ and angle $\theta^2$ are about 60°, wherein the term "about" in this context can only mean±5°. The first plurality of fibers 102 may intersect the second plurality of fibers 104 in a crisscross pattern.

Fabric 100 may further include a third plurality of fibers 106 oriented parallel to the longitudinal direction of the fabric 100. In various embodiments, fabric 100 comprises three sets of fibers (i.e., first plurality of fibers 102, second plurality of fibers 104, and third plurality of fibers 106), also referred to as a "triaxial" tow. For example, fabric 100 may comprise a triaxial tow of 0/+60/−60, where "0" refers to the angle of the third plurality of fibers 106 with respect to the longitudinal direction (i.e., parallel), "+60" refers to the angle $\theta^1$ of the first plurality of fibers 102, and "−60" refers to the angle $\theta^2$ of the second plurality of fibers 104.

Fabric 100 may further include a fourth plurality of fibers 108 oriented perpendicular to the longitudinal direction of the fabric 100. Stated differently, the fourth plurality of fibers 108 may be oriented parallel to a transverse or crosswise direction (i.e., the Y-direction) of the fabric 100. In various embodiments, fabric 100 comprises four sets of fibers (i.e., first plurality of fibers 102, second plurality of fibers 104, third plurality of fibers 106, and fourth plurality of fibers 108), also referred to as a "quad" tow. For example, fabric 100 may comprise a quad tow of 0/+45/90/−45, where "0" refers to the angle of the third plurality of fibers 106 with respect to the longitudinal direction (i.e., parallel), "+45" refers to the angle $\theta^1$ of the first plurality of fibers 102, "90" refers to the angle of the fourth plurality of fibers with respect to the longitudinal direction, and "−45" refers to the angle $\theta^2$ of the second plurality of fibers 104.

In various embodiments, first plurality of fibers 102, second plurality of fibers 104, third plurality of fibers 106, and fourth plurality of fibers 108 comprise polyacrylonitrile (PAN) or OPF fibers.

Figure 2:
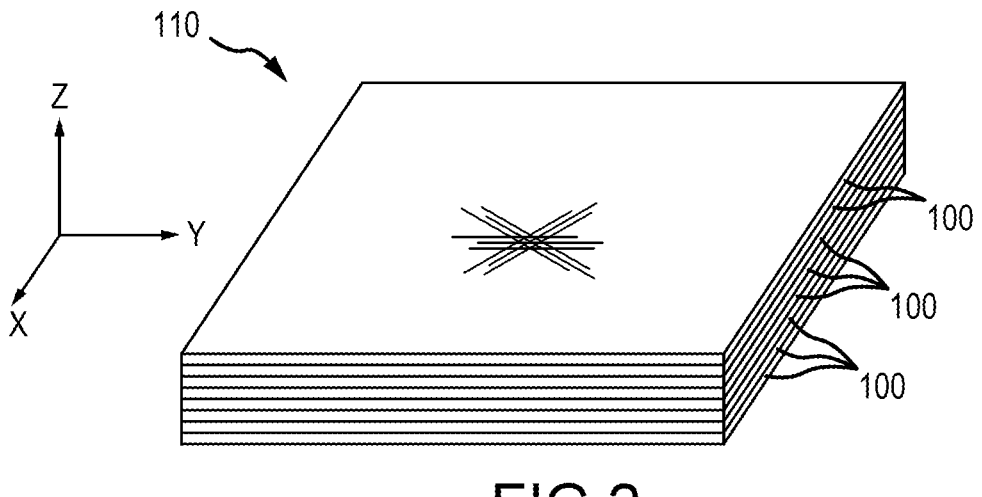
FIG. 2 is a perspective illustration of fibrous preform, in accordance with various embodiments.

With reference to FIG. 2, a fibrous preform 110 in accordance with various embodiments is illustrated. Fibrous preform 110 may comprise a plurality of sheets of fabric 100 stacked together. Sheets of fabric 100 may all be oriented in a common direction so that their respective plurality of fibers (i.e., first plurality of fibers 102, second plurality of fibers 104, third plurality of fibers 106, and/or fourth plurality of fibers 108) are commonly oriented, or may be alternatingly rotated so that their respective plurality of fibers extend in different direction in a crisscross pattern. Fibrous preform 110 may comprise one or more layers of a non-woven fabric, one or more layers of a woven fabric (e.g., plain weave, 5-harness satin weave, 8-harness satin weave, etc.), or combinations thereof. Fibrous preform 110 may comprise PAN or OPF fibers extending in three directions and leaving a plurality of pores or open spaces and may be prepared for shape-forming, compression, and carbonization. In various embodiments, fibrous preform 110 is formed by stacking layers of PAN or OPF fibers and superimposing the layers (e.g., by stacking sheets of fabric 100). The layers may be needled perpendicularly to each other (i.e., along the Z-direction) with barbed, textile needles or barbless, structuring needles. In various embodiments, the layers are needled at an angle of between 0° and 60° (e.g., 0°, 30°, 45°, and/or 60°) with respect to the Z-direction to each other. The needling process generates a series of z-fibers through fibrous preform 110 that extend perpendicularly to the fibrous layers. The z-fibers are generated through the action of the needles pushing fibers from within the layer (x-y or in-plane) and reorienting them in the z-direction (through-thickness). Needling of the fibrous preform may be done as one or more layers are added to the stack or may be done after the entire stack of layers is formed. The needles may also penetrate through only a portion of fibrous preform 110, or may penetrate through the entire fibrous preform 110. In addition, resins are sometimes added to fibrous preform 110 by either injecting the resin into the preform following construction or coating the fibers or layers prior to forming the fibrous preform 110. The needling process may take into account needling parameters optimized to maintain fiber orientation, minimize in-plane fiber damage, and maintain target interlaminar properties.

Figures 3A, 3B, 3C:
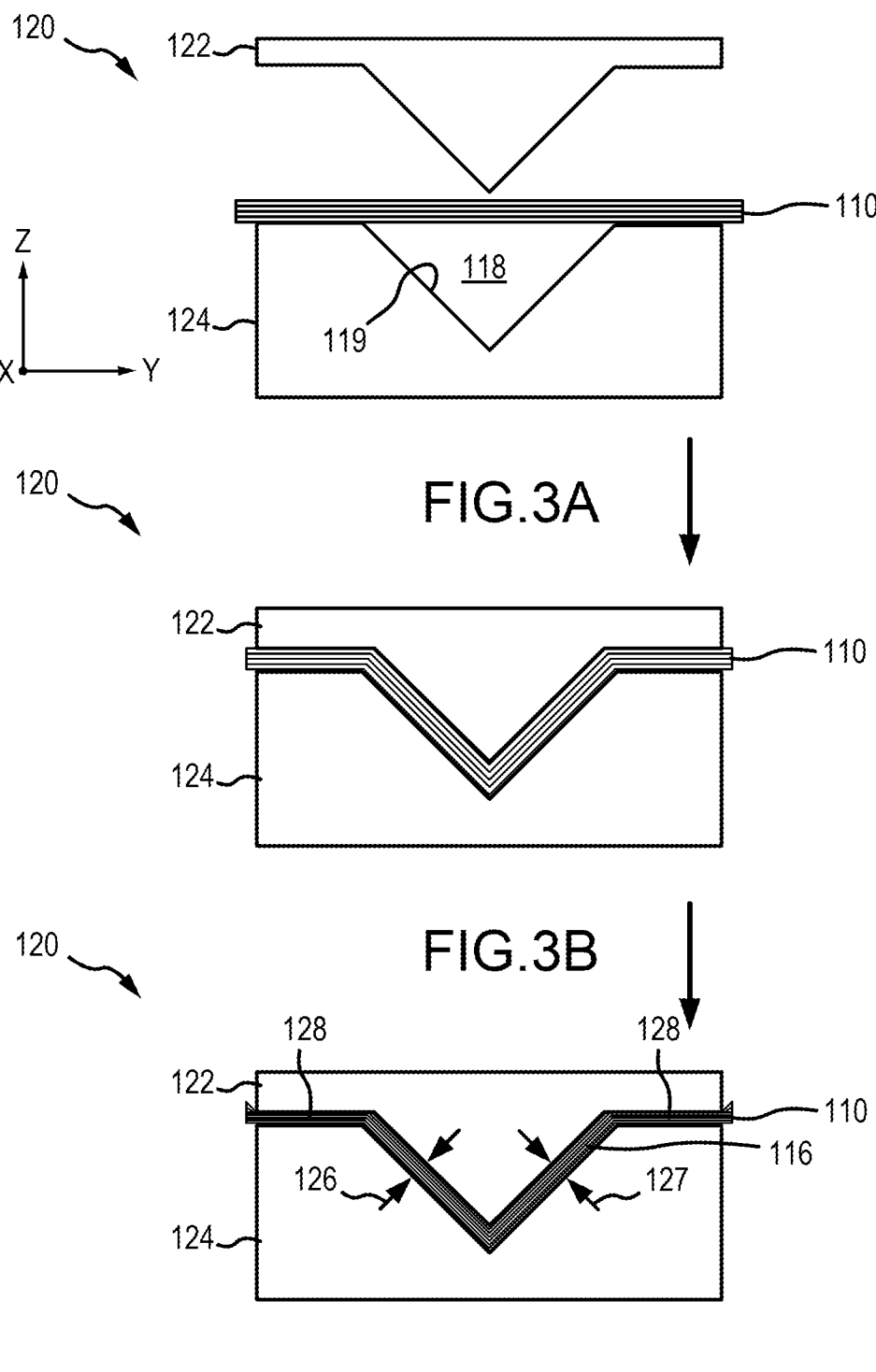
FIG. 3A, FIG. 3B, and FIG. 3C are schematic illustrations of the shape-forming of a fibrous preform, in accordance with various embodiments.

After needling the fibrous preform 110, the fibrous preform 110 may be both compressed to higher fiber volume ratio and formed to shape in a single-step shape-forming process; though it is also contemplated that in various embodiments the fibrous preform 110 is compressed and shape formed without undergoing the needling process. With reference to FIG. 3A, fibrous preform 110 may be placed in a shape-forming tool 120. Shape-forming tool 120 may be configured as a matched die forming tool. Shape forming tool 120 may comprise a press tool comprising a first member 122 (e.g., also referred to as an upper half of a die set, a stamp die, a punch, a plug, a wedge, or a male tool) and a second member 124 (e.g., also referred to as a lower half of a die set, a die block, or a female tool). In various embodiments, first member 122 and second member 124 are made from a metal material.

Figure 4:
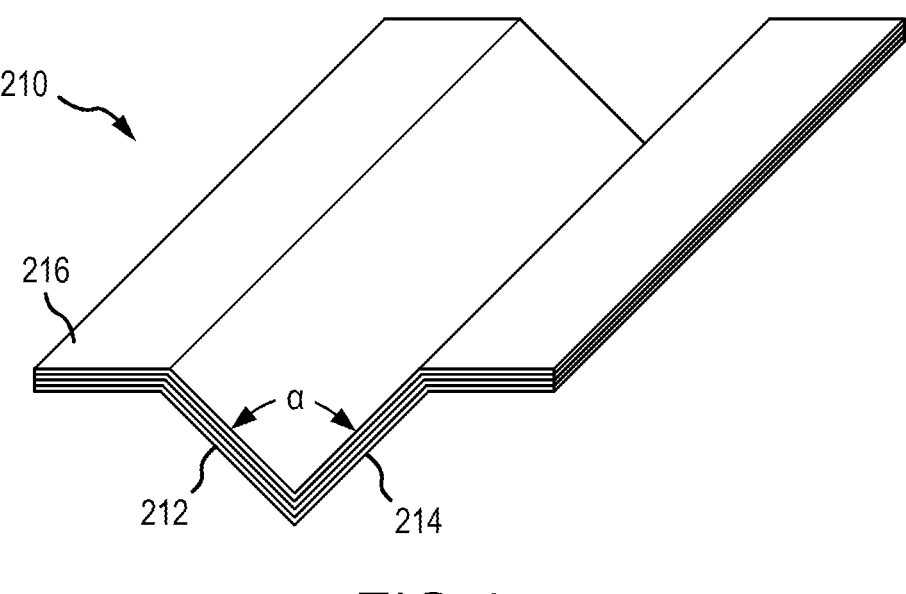
FIG. 4 is a perspective illustration of a shape-formed fibrous preform, in accordance with various embodiments.

The first member 122 is moveable with respect to the second member 124 to compress the fibrous preform 110 therebetween, thereby shaping and/or compressing the fibrous preform 110. The second member 124 is configured with at least one die recess 118; e.g., an aperture such as a pocket, a channel, a groove, etc. The die recess 118 may be at least partially defined by a recess surface 119. Recess surface is a concave or concave-convex surface and may have a curved geometry; e.g., a three-dimensional (3D) curvature. The recess surface 119 of FIG. 4, for example, has a curved (e.g., arcuate, splined, etc.) cross-sectional geometry in a lateral-vertical reference plane; e.g., a Y-Z plane. The recess surface 119 may also have a curved (e.g., arcuate, splined, etc.) cross-sectional geometry in a longitudinal-vertical reference plane; e.g., a X-Z plane. This recess curvature may change as the recess surface 119/the die recess 118 extends laterally and/or longitudinally, which may provide the recess surface 119 with a complex 3D curvature. In embodiments, the recess curvature may remain uniform as the recess surface 119/the die recess 118 extends laterally and/or longitudinally. The recess surface 119 may be configured without any sharp corners or sharp transitions.

In various embodiments, the fibrous preform 110 may comprise a generally planar preform (see FIG. 3A) and may be placed over the second member 124. Prior to forming the shaped body from the fibrous preform 110, for example, the fibrous preform 110 and its stack of sheets of fabric 100 may be configured as a flat plate. Of course, in other embodiments, one or more of the sheets of fabric 100 of the fibrous preform may slightly bend (e.g., droop) into the die recess 118.

With reference to FIG. 3B, the first member 122 may be moved toward the second member 124, thereby causing the fibrous preform 110 to bend to conform to the contour of the die recess 118 of the second member 124 (and the contour of the first member 122), thereby transforming into a 3D shape (e.g., a complex 3D curvature having a first curved geometry or angle in a first reference plane—e.g., the Y-Z plane—and a second curved geometry or angle in a second reference plane—e.g., the X-Z plane). With reference to FIG. 3C, the first member 122 may continue to move toward the second member 124, thereby causing the fibrous preform 110 to compress such that an overall thickness of the shape-formed fibrous preform 110 is decreased and a fiber volume ratio of the shape-formed fibrous preform 110 is increased. In various embodiments, the tool 120 is configured to provide normal pressure (e.g., as illustrated by arrows 126 and arrows 127) evenly distributed throughout the fibrous preform 110 as the fibrous preform 110 is shaped and compressed during the shape-forming process.

In various embodiments, heat is added to the fibrous preform 110 during the shape forming process. For example, tool 120 may be a heated press whereby heat is conducted from the tool 120 into the fibrous preform 110. In various embodiments, it is further contemplated that heaters, separate from the tool 120, may be provided for heating the fibrous preform 110 during the shape-forming process. In various embodiments, tool 120 may be placed in an oven or heated platen press before or during the shape forming process. In various embodiments, components of the tool 120 may be heated in an oven or heated platen press prior to being introduced to the fibrous preform 110, for example to a shape forming temperature of between 150° F. and 400° F. (65° C.-205° C.) in various embodiments, between 200° F. and 350° F. (93° C.-177° C.) in various embodiments, between 200° F. and 300° F. (93° C.-149° C.) in various embodiments, and between 225° F. and 275° F. (107° C.-135° C.) in various embodiments.

In various embodiments, moisture is added to the fibrous preform 110 during the shape-forming process. For example, a sizing agent comprising a fluid and/or fluid vapor such as water, polyvinyl alcohol, and/or steam may be applied to the fibrous preform 110 (e.g., before being shape formed). For example, steam may be applied to the fibrous preform 110 for a predetermined duration while the fibrous preformed is being formed into the shaped body and/or held in compression in the die recess. Adding the sizing agent (e.g., water, polyvinyl alcohol, modified starch, carboxymethyl cellulose, modified wax, acrylates, and/or steam) to the fibrous preform 110 may dampen the fibers thereof which tends to relax the fibers of the fibrous preform thereby aiding in the bending, forming, and/or stretching of the fibrous preform. Sizing may help to protect the fiber from handling damage and provide lubricity allowing the fibers to slide easily during preforming/compaction and aid in preventing wrinkling and kinking. Sizing agents of the present disclosure include water soluble polymers. The sizing agent may comprise a water solution. The sizing agent and may comprise long chain alcohols such as polyvinyl alcohols, modified starch, cellulose gum such as carboxymethyl cellulose, modified wax, acrylates, and/or mixtures thereof. In various embodiments, approximately 1 milliliter (ml) of sizing agent (e.g., water) may be added for every 2.5 cubic inches of fibrous preform (1 ml/2.5 in$^3$), wherein the term approximately as used in this context can only mean±0.5 ml. Stated differently, between 0.5 ml and 1.5 ml of water may be added to the fibrous preform for every 2.5 cubic inches of fibrous preform. However, it should be understood that other amounts of water or sizing agent may be added to the fibrous preform without departing from the scope of the present disclosure. Moreover, the fibrous preform may be preconditioned in a humidity chamber at a humidifying temperature (e.g., between 100° F. (37.8° C.) and 200° F. (93.3° C.)) and a relative humidity (e.g., between 75% and 90% humidity). Adding the sizing agent to the fibrous preform 110 may tend to reduce wrinkling of the fibrous preform 110 and support stabilizing the preform into the desired shape. In this manner, the OPF fibrous preform 110 may be compressed to higher fiber volume ratio and formed to shape using heat, moisture, and pressure into contoured shapes using tool 120 as desired for a particular C/C part application.

Figure 5:
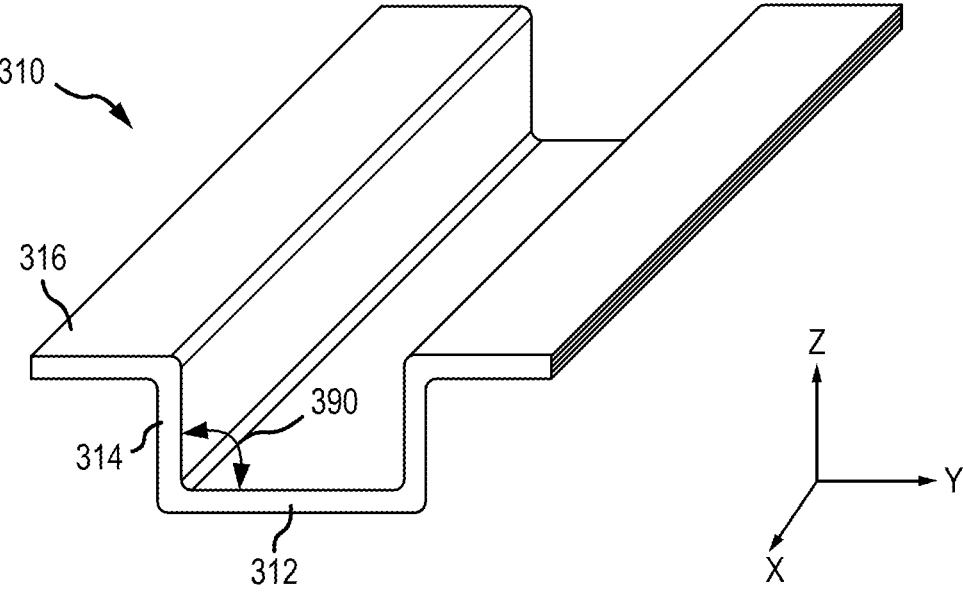
FIG. 5 is a schematic illustrations of a fibrous preform shaped into a more complex, multi-angle U-channel shape, in accordance with various embodiments.

Tool 120 may form the fibrous preform 110 into the final, or near final, shape of the desired C/C part. For example, with reference to FIG. 4, an exemplary shape-formed fibrous preform 210 (also referred to herein as a shaped body) having a first portion 212 bent at an angle α with respect to a second portion 214 is illustrated, in accordance with various embodiments. In various embodiments, angle α is between one degree and one hundred and seventy-nine degrees (1°-179°), between five degrees and one hundred and seventy-nine degrees (5°-179°), between thirty degrees and one hundred and seventy degrees (30°-170°), between thirty degrees and one hundred and twenty degrees (30°-120°), between forty-five degrees and one hundred and seventy degrees (45°-170°), between sixty degrees and one hundred and seventy degrees (60°-170°), between ninety degrees and one hundred and seventy degrees (90°-170°), between forty-five degrees and one hundred and thirty-five degrees (45°-135°), or between eighty degrees and one hundred degrees (80°-100°). The angle α is generally chosen based on the shape of the desired C/C part. The shape-formed fibrous preform 210 may further comprise additional portions (such as third portion 216) which may be retained or removed as desired, depending on the desired shape of the final C/C part. The part may also be formed into more complex, multi-angle U-channel shapes to form aeroshells or other forms used for re-entry vehicle carbon/carbon heat shield applications, for example similar to the shape-formed fibrous preform 310 as illustrated in FIG. 5. In this manner, the shape-formed fibrous preform 210 may comprise two or more angles and/or curved surfaces in more than one plane.

With reference to FIG. 5, the fibrous preform 310 may be shaped into a final, or near final, shape of the desired C/C part. In various embodiments, fibrous preform 310 comprises a U-shape cross-sectional geometry (e.g., in the Y-Z plane). Fibrous preform 310 may include a base wall 312 and one or more sidewalls 314 bent at an angle 390 with respect to base wall 312, in accordance with various embodiments. In various embodiments, angle 390 is between one degree and one hundred and seventy-nine degrees (1°-179°), between thirty degrees and one hundred and seventy degrees (30°-170°), between thirty degrees and one hundred and twenty degrees (30°-120°), between forty-five degrees and one hundred and seventy degrees (45°-170°), between sixty degrees and one hundred and seventy degrees (60°-170°), between ninety degrees and one hundred and seventy degrees (90°-170°), between thirty degrees and one hundred and seventy degrees (30°-170°), between eighty degrees and one hundred degrees (80°-100°), or about ninety degrees (90°). The angle 390 is generally chosen based on the shape of the desired C/C part. The shape-formed fibrous preform 310 may further comprise additional portions (such as third portion 316) which may be retained or removed as desired, depending on the desired shape of the final C/C part.

After the fibrous preform 110 is shape-formed, the shape-formed fibrous preform 110 may be moved to a graphite fixture or fixture configured to apply pressure to the shape-formed fibrous preform 110 during the subsequent carbonization process.

Figure 6:
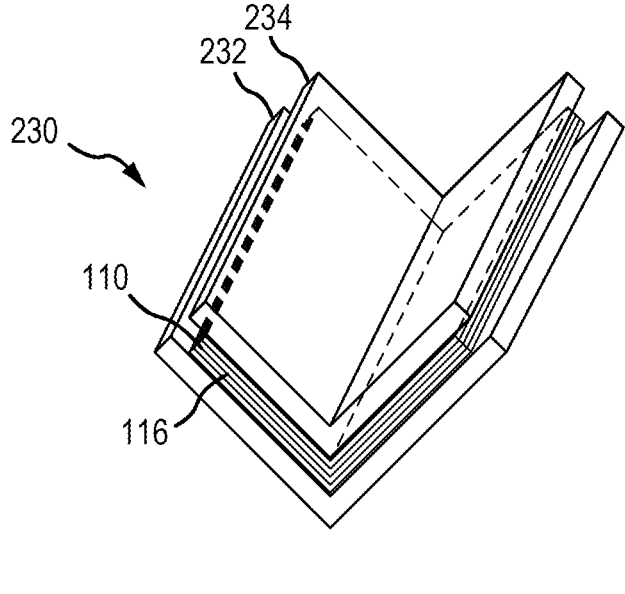
FIG. 6 is a perspective illustration of a shape-formed fibrous preform installed in a graphite fixture for carbonization, in accordance with various embodiments.
Figure 7:
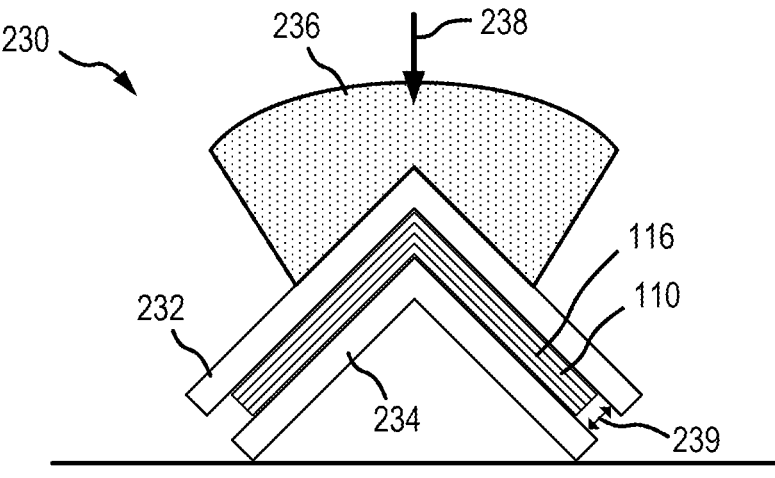
FIG. 7 is a perspective illustration of a dead weight installed over the graphite fixture with a shape-formed fibrous preform located therein, in accordance with various embodiments.

With reference to FIG. 6, shape-formed fibrous preform 110 is illustrated having had the outer portions 128 (see FIG. 3C) trimmed away. However, it should be understood that the shape-formed fibrous preform 110 is not necessarily trimmed at this stage. A graphite fixture 230 is provided which comprises contoured surfaces similar to those of the shape forming tool 120. In this manner, graphite fixture 230 is configured to maintain the shape of the shape-formed fibrous preform 110 previously achieved using the shape forming tool 120. Graphite fixture 230 may be configured to further compress the shape-formed fibrous preform 110 beyond that which might typically be achieved without compression. In this manner, graphite fixture 230 is configured to continue to compress the shape-formed fibrous preform 110 as the shape-formed fibrous preform 110 shrinks during the carbonization process. In various embodiments, graphite fixture 230 comprises a first member 232 and a second member 234. The graphite fixture 230 is configured to receive the shape-formed fibrous preform 110 between first member 232 and second member 234. With additional reference to FIG. 7, shape-formed fibrous preform 110 may be held in compression by placing a dead weight 236 onto first member 232. In this manner, gravitational forces and the dead weight may hold shape-formed fibrous preform 110 in compression between first member 232 and second member 234. In various embodiments, externally applied hydraulic compression forces may be used to hold shape-formed fibrous preform 110 in compression between first member 232 and second member 234. Because first member 232 is non-rigidly coupled to second member 234, and gravitational forces (represented by arrow 238) pull first member 232 toward second member 234 (i.e., downward in FIG. 7), the graphite fixture 230 is configured to accommodate shrinkage and further compression of shape-formed fibrous preform 110 during carbonization. In this regard, as shape-formed fibrous preform 110 shrinks during carbonization, the gap 239 between first member 232 and second member 234 may decrease due to the dead weight 236 biasing first member 232 toward second member 234. In this manner, the shape of shape-formed fibrous preform 110 is maintained and the fiber density of shape-formed fibrous preform 110 is maintained or further increased. In various embodiments, first member 232 is not in direct contact with second member 234. Stops may also be used during the carbonization process to control the carbonized preform thickness and fiber volume ratio to the target level.

Figure 8:
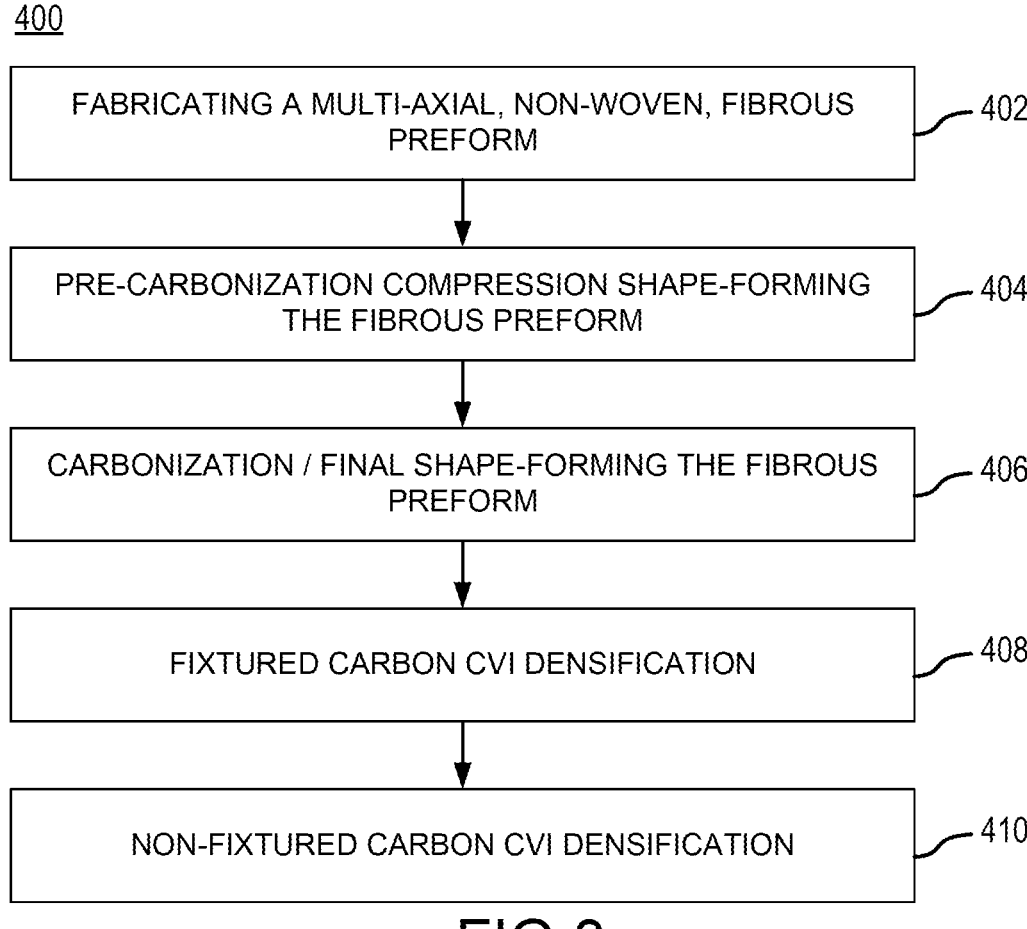
FIG. 8 is a flow diagram of a method for manufacturing a 3D C/C part, in accordance with various embodiments.

With reference to FIG. 8, a flow diagram of a method 400 for manufacturing a C/C part is provided, in accordance with various embodiments. For ease of description, the method 400 is described below with reference to FIG. 1 through FIG. 7 and FIG. 9. The method 400 of the present disclosure, however, is not limited to use of the exemplary shape forming tool 120 of FIG. 3A, FIG. 3B, and FIG. 3C, or the exemplary graphite fixture 230 of FIG. 6 and FIG. 7, or the exemplary graphite fixture 530 of FIG. 9.

In step 402, the fibrous preform 110 is provided. Fibrous preform 110 may be fabricated as described with respect to FIG. 1 and FIG. 2 to comprise a stack of sheets of multi-axial, non-crimp, OPF fabric 100 generally arranged as a flat plate, in accordance with various embodiments.

In step 404, pre-carbonization compression of the fibrous preform 110 is performed, for example using shape forming tool 120 as described with respect to FIG. 3A, FIG. 3B, and FIG. 3C. In various embodiments, with the first member 122 in the closed position (e.g., see FIG. 3C), the shape forming tool 120 and shaped body 116 may be heated to the shape forming temperature (e.g., loaded into an oven or a heated platen press) for a predetermined duration (e.g., between 10 minutes and 24 hours in various embodiments). A dead weight or hydraulic pressure using a heated platen press may be applied to the top sides of the first member while the compressed assembly is in the oven or press so that the first member is biased toward the second member 124 as the shaped body 116 compresses and/or shrinks over time. In this manner, the shape forming tool 120 continually applies a compressing force to the shaped body 116.

In various embodiments, due to the material properties of the multi-axial, non-crimp, OPF fabric 100 (see FIG. 1), prior to carbonization, each fibrous preform 110 may have a fiber volume ratio of between 0.40 to 0.60 (40%-60%). In various embodiments, prior to carbonization, fibrous preform 110 comprises a fiber volume ratio of 40% or greater. In various embodiments, prior to carbonization, fibrous preform 110 comprises a fiber volume ratio between 40% and 60%.

In step 406, the shape-formed fibrous preform 110 is released from the shape forming tool 120 (e.g., see FIG. 4) and moved to a graphite fixture 230 (see FIG. 6 and FIG. 7) for further processing. The graphite fixture 230 is configured to accommodate shrinkage of shaped body 116 during carbonization. In this regard, as shape-formed fibrous preform 110 shrinks during carbonization, the gap between first member 232 and second member 234 may decrease due to the dead weight 236 biasing first member 232 towards second member 234. In this manner, the shape of shape-formed fibrous preform 110 is maintained and the fiber density of shape-formed fibrous preform 110 is further increased.

With the shape-formed fibrous preform 110 secured in compression within graphite fixture 230, the shape-formed fibrous preform 110 may be carbonized to maintain shape and further decrease fiber volume ratio to a fiber volume ratio of between 20% and 40%, and in various embodiments a fiber volume ratio of between 25% and 40%. In various embodiments, shape-formed fibrous preform 110 together with graphite fixture 230 may be placed in a furnace for carbonization. The carbonization process may be employed to convert the fibers of the shaped body 116 into pure carbon fibers, as used herein only "pure carbon fibers" means carbon fibers comprised of at least 99% carbon. The carbonization process is distinguished from the densification process described below in that the densification process involves infiltrating the pores of the shaped body 116 and depositing a carbon matrix within and around the carbon fibers of the shaped body 116, and the carbonization process refers to the process of converting the fibers of the shape-formed fibrous preform 110 into pure carbon fibers.

The shape-formed fibrous preform 110 may be carbonized by placing the shape-formed fibrous preform 110 in a furnace with an inert atmosphere. In general, the carbonization process involves heating the shape-formed fibrous preform 110 in a furnace to a temperature greater than about 1,600 degrees Celsius (2,912 Fahrenheit). Typically, an inert atmosphere of nitrogen, argon or a vacuum is provided in the furnace during the carbonization process. The heat of the furnace causes a chemical conversion of the OPF that converts the fibers to carbon fibers and drives off other chemicals. Although it is sometimes preferred that the fibers in the carbonized fiber preform be 100% carbon fiber, it is generally acceptable for a less than full conversion to take place. The resulting carbonized fiber preform generally has the same fibrous structure as the fibrous preform before carbonizing. During carbonization, the total mass and the total fiber volume ratio in each fibrous preform is typically reduced due to the loss of non-carbon compounds.

In step 408, after carbonization, shape-formed fibrous preform 110 (now shaped body 116) comprises a fiber volume ratio of 20% or greater. In various embodiments, after carbonization, shaped body 116 comprises a fiber volume ratio of between 20% and 40%. In various embodiments, after carbonization, fibrous preform 110 comprises a fiber volume ratio of between 25% and 35%. Fiber density of the fibrous preform 110 may increase during carbonization (e.g., from about 1.37 g/cc in OPF state to about 1.77-1.85 g/cc after carbonization, depending on the final carbonization temperature). In various embodiments, the OPF fibers shrink during carbonization, as OPF may have a char/carbon yield of around 50%. As used herein "char/carbon yield" means the remaining mass of the OPF after degrading the OPF using the carbonization process.

After carbonization, shaped body 116 may be densified using chemical vapor infiltration (CVI), as described in further detail below. After carbonization, and with momentary reference to FIG. 8, shaped body 116 may be densified in a graphite fixture 530 (also referred to herein as a second graphite fixture or a perforated graphite fixture) designed with holes or perforations 535 in the graphite fixture 530 to facilitate carbon infiltration. Graphite fixture 530 comprises a first perforated member 532 and a second perforated member 534. The graphite fixture 530 is configured to receive the carbonized, shape-formed, fibrous preform 110 between first perforated member 532 and second perforated member 534 during the densification process. The shaped body 116 may be densified with pyrolytic carbon by CVI using optimized process conditions and in graphite hardware to maintain shape and support efficient carbon densification. In general, densification involves filling the voids, or pores, of the fibrous preform with additional carbon material. This may be done using the same furnace used for carbonization or a different furnace. Typically, chemical vapor infiltration and deposition ("CVI/CVD") techniques are used to densify the porous fibrous preform with a carbon matrix. This commonly involves heating the furnace and the carbonized preforms, and flowing hydrocarbon gases (e.g., at least one of methane, ethane, propane, butane, and/or the like, as described herein) into the furnace and around and through the fibrous preforms. In various embodiments, the CVI/CVD process may include a temperature gradient. In various embodiments, the CVI/CVD process may include a pressure gradient. In various embodiments, the CVI/CVD process may include a temperature and a pressure gradient.

CVI/CVD densification may be conducted in a vacuum or partial vacuum (e.g., at pressures of 1-15 torr) or in an inert atmosphere at a temperature in the range from about 900° C. to about 1100° C. (1,652° F. to about 2,012° F.), and in various embodiments in the range of up to about 1,000° C. (1,832° F.) (wherein the term about in this context only means +/−100° C.) for a period of time in the range from about 150 hours to about 650 hours, and in various embodiments, in the range from about 300 hours to about 500 hours (wherein the term about in this context only means +/−24 hours). As a result, carbon from the hydrocarbon gases separates from the gases and is deposited on and within the fibrous preforms.

Figure 9:
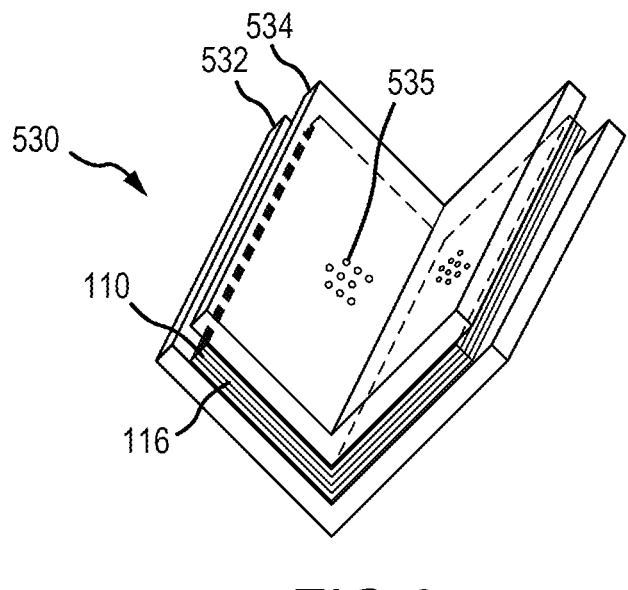
FIG. 9 is a perspective illustration of the carbonized, shape-formed, fibrous preform installed in a perforated graphite fixture for densification, in accordance with various embodiments.

With momentary reference to FIG. 9, first perforated member 532 and a second perforated member 534 contain through holes or perforations 535 that are sized and located to allow the flow of gas through the shaped body 116 while maintaining structural integrity to allow for compression induced by, for example, graphite C-clamps and shims located on the periphery of the members 532, 534. The compression tends to aid in maintaining the shape of the shaped body 116. The compression tends to impart interlaminar strength to the shaped body 116 during the CVI/CVD process and/or heat treat process. First perforated member 532 and a second perforated member 534 are design to facilitate separation of the shaped body 116 from the graphite fixture 530 after the CVI/CVD run, i.e., to prevent CVD bonding between the members 532, 534 and the shaped body 116. This ability to effectively release may be achieved by the application of graphite paint on the contact surfaces of the members 532, 534 prior to assembling the shaped body 116 in the graphite fixture 530. The assembled fixtures for CVI/CVD may be located within the furnace such that there is a primary gas flow path across the fixture, to enhance densification of the part. After a first CVI/CVD cycle of 300 to 500 hours, an intermediate heat treat is typically performed, in the same furnace. This heat treat (>1600° C.) serves to dimensionally stabilize the shaped body 116, increase its thermal properties, and increase its porosity for subsequent densification. The shaped body 116 may then be machined to open the porosity further, to help allow for final density to be achieved using only one more CVI/CVD cycle. Part densities after first machining may be in the range of 1.4 to 1.7 g/cc, depending on the part thickness, overall size, and placement within the furnace. Typical, average density range is 1.55-1.65 g/cc.

In step 410, the densification process may be continued until the preform reaches a desired density, for example in the range from 1.7 to 1.9 grams per cubic centimeter (g/cc), and in various embodiments, a density of approximately 1.80 g/cc. The CVI/CVD process may be continued with the shaped body 116 removed from the graphite fixture 530. In this manner, the outer surfaces of the shaped body 116 may be more directly exposed to the gas flow. Moreover, the shaped body 116 may be machined in between carbon CVI densification processes (e.g., between fixtured carbon CVI densification and non-fixtured carbon CVI densification and/or between successive non-fixtured carbon CVI densification processes). Machining (e.g., grinding, sanding, milling, grit blasting, etc.) the shaped body 116 may be performed to achieve a final desired part shape. Machining the shaped body 116 may be performed to expose voids, or pores, of the shaped body 116 so as to facilitate infiltration with additional carbon material during subsequent carbon CVI densification. When the densification step is completed, and the desired density is achieved, the resulting C/C part has a carbon fiber structure with a carbon matrix infiltrating the fiber structure, thereby deriving the name "carbon/carbon."

Following the CVI/CVD densification process, the C/C part may undergo a final heat treatment (FHT) process. This may be done using the same furnace used for densification or a different furnace. If done using the same furnace, the flow of hydrocarbon gases would be stopped following the end of the densification process and the temperature increased. FHT may be conducted in a vacuum or partial vacuum (e.g., at pressures of 1-15 torr) or in an inert atmosphere at a temperature in the range from about 1200° C. to about 2600° C. (2,192° F. to about 4,712° F.), and in various embodiments in the range from about 1400° C. to about 2200° C. (2,552° F. to about 3,992° F.) (wherein the term about in this context only means +/−100° C.) for a period of time in the range from about 4 hours to about 14 hours, and in various embodiments, in the range from about 8 hours to about 12 hours (wherein the term about in this context only means +/−2 hours). In various embodiments, the FHT process imparts high temperature dimensional stability to the final C/C part. In various embodiments, the FHT process imparts desired thermal properties associated with thermal shock such as high thermal conductivity, high heat capacity, and/or high emissivity.

Figure 10A:
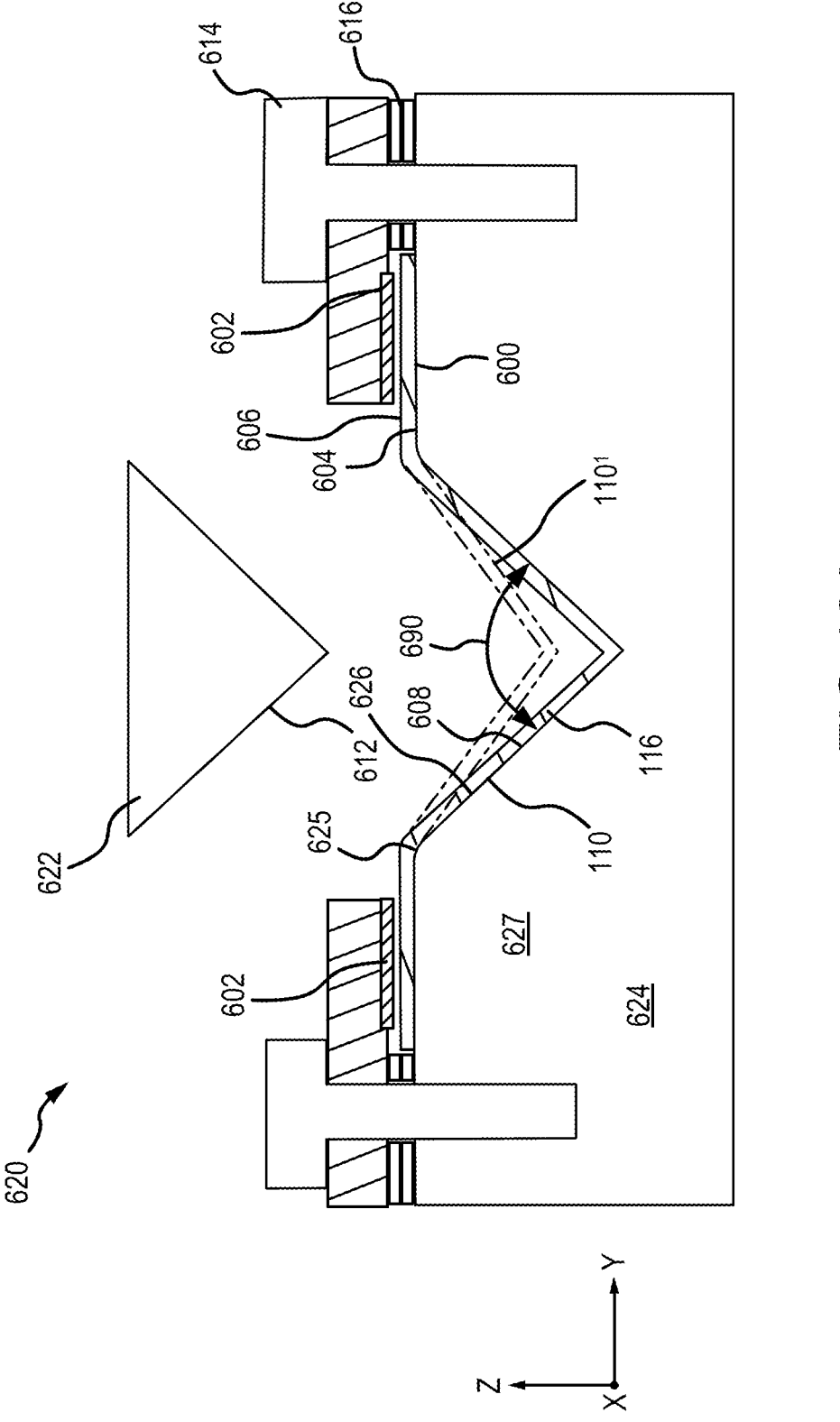
FIG. 10A is a schematic illustration of a shape-forming tool comprising grip strips, in accordance with various embodiments.

With reference to FIG. 10A, a shape-forming tool 620 is illustrated, in accordance with various embodiments. Shape forming tool 620 may be similar to shape forming tool 120 (see FIG. 3A) except that shape forming tool 620 further comprises one or more grip strips 602 disposed at opposing lateral ends of the fibrous preform 110. Each grip strip 602 may be configured with a relatively high coefficient of static friction and/or kinetic friction, whereas each bottom die top surface 604 may be configured with a relatively low coefficient of static friction and/or kinetic friction. The contact surface of the grip strip 602, for example, may be textured whereas each bottom die top surface 604 may be smooth; e.g., polished. The grip strip 602 may also or alternatively be formed from a material with a higher coefficient of static friction and/or kinetic friction than the material of the bottom die 624 (also referred to herein as a female forming tool). In various embodiments, the contact surface of the grip strip 602 may also include one or more protrusions for penetrating into the fibrous preform 110. The protrusions may thereby lock a portion (e.g., the top layer 606 and one or more underlying layers) of the fibrous preform 110 in place; e.g., constrain movement of the respective engaged preform portion.

A top ply or layer 606 of the fibrous preform may be disposed next to and under the grip strips 602. The grip strips 602 of FIG. 10A, for example, are disposed along a periphery of the fibrous preform 110. During the pressing, the upper die 622 may be pressed into the lower die 624 with a hydraulic press, or the like. The grip strips 602 may selectively grip the preform 110 and its stack of the layers of material. Each grip strip 602 of FIG. 10A, for example, vertically engages (e.g., contact, press against) the top layer 606 of the fibrous preform, which may clamp the stack of the layers of material vertically between the respective grip strip 602 and the bottom die 624 and its top surface 604. The relatively low coefficient of friction of the respective bottom die top surface 604 may facilitate sliding of the bottom layer of material (and in some cases the intermediate layer(s) of material) along the bottom die 624. The relatively high coefficient of friction of the grip strip 602, on the other hand, may anchor (or slow sliding of) the top layer 606 of the fibrous preform 110 against the grip strip 602. The grip strips 602 may thereby facilitate differential movement (e.g., sliding, pulling, etc.) between the layers of material in the fibrous preform 110, which may reduce bunching, kinking and/or other deformation of the stack of the layers of material of the fibrous preform 110 during the forming of the shaped body 116.

The differential movement between the layers of material in the fibrous preform 110 may be tuned by individually activating and deactivating the grip strips 602 depending on the specific configuration of the die recess 608, the die protrusion 612 and/or material properties of the preform 110. In various embodiments, clamping bolts 614 are used to move the grip strips 602 with respect to the bottom die 624. For example, the clamping bolts 614 may be tightened to move the grip strips 602 toward the bottom die top surface 604 and the clamping bolts 614 may be loosened to move the grip strips 602 away from the bottom die top surface 604. In this manner, the grip strips 602 may have an adjustable clamping force.

With the fibrous preform 110 secured to the bottom die top surface 604 with the grip strips 602, the fibrous preform 110 may not rest completely against the die recess 608, as illustrated by fibrous preform 110$^1$. In this regard, as top die 612 moves toward bottom die 624 and contacts the fibrous preform 110$^1$, the fibrous preform may stretch as it is formed into the bottom die 624, in accordance with various embodiments.

In various embodiments, the angle 690 of the die recess 608 of the bottom die 624 may be designed and configured to allow for some spring back (e.g., may be 10 to 20 degrees less than a desired angle of the C/C component).

At least one removable spacer plate 616 may be placed between the grip strip 602 and the bottom die 624. Additional spacer plates 616 may be added or removed depending on the thickness of the preform 110. The spacer plate(s) 616 may be located in the area of the threaded connection (i.e., clamping bolts 614) to provide stability to the joint. In various embodiments, the clamping bolt 614 extends through the spacer plate(s) 616.

In various embodiments, the die recess 608 comprises a radii surface 625 which forms a rounded, convex surface transition between a sidewall portion 626 of the die recess 608 and the bottom die top surface 604. The fibrous preform may be bent around or over radii surface 625. Radii surface 625 may minimize wrinkling of the fibrous preform 110 during the forming process. Radii surface 625 may extend between and to a first end 627 of the female forming tool 624 (e.g., the front surface as viewed in FIG. 10A) and a second end, opposite the first end, of the female forming tool 624 (e.g., the back surface as viewed in FIG. 10A).

The shape forming tool 620 and its components 622, 624 are described above using the terms "bottom" and "top" with reference to exemplary orientations in the drawings. The present disclosure, however, is not limited to any particular formation system orientations. For example, in other embodiments, the top die 622 may alternatively be configured as a bottom die and the bottom die 624 may alternatively be configured as a top die.

Figure 10B:
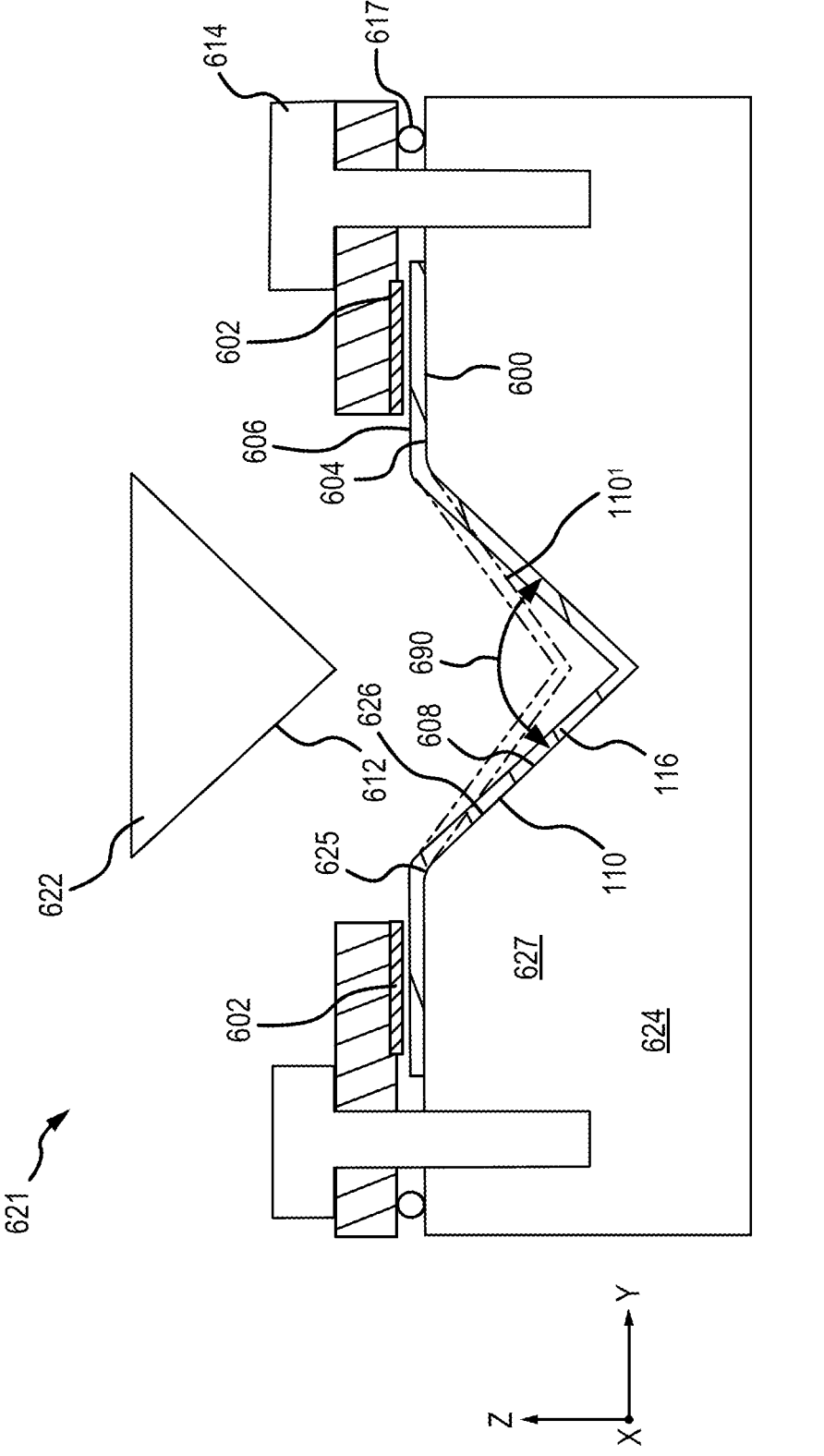
FIG. 10B is a schematic illustration of a shape-forming tool comprising grip strips adjustable with pivoting members, in accordance with various embodiments.

With respect to FIG. 10B, elements with like element numbering, as depicted in FIG. 10A, are intended to be the same and will not necessarily be repeated for the sake of clarity.

With reference to FIG. 10B, a shape-forming tool 621 is illustrated, in accordance with various embodiments. Shape forming tool 621 may be similar to shape forming tool 620 (see FIG. 10A) except that shape forming tool 621 comprises a pivoting member 617. As the clamping bolt 614 is tightened, grip strip 602 may contact pivoting member 617 to cause grip strip to rotate with respect to clamping bolt 614 and bottom die 624 to move grip strip 602 toward bottom die top surface 604 and fibrous preform 110. In various embodiments, pivoting member 617 acts as a fulcrum about which grip strip 602 pivots as the clamping bolt 614 is adjusted. In various embodiments, pivoting member 617 engages grip strip 602 to drive rotating of grip strip 602 with respect to clamping bolt 614 and bottom die 624 as the clamping bolt 614 is adjusted. In this manner, the grip strips 602 may have an adjustable clamping force.

Figure 11A:
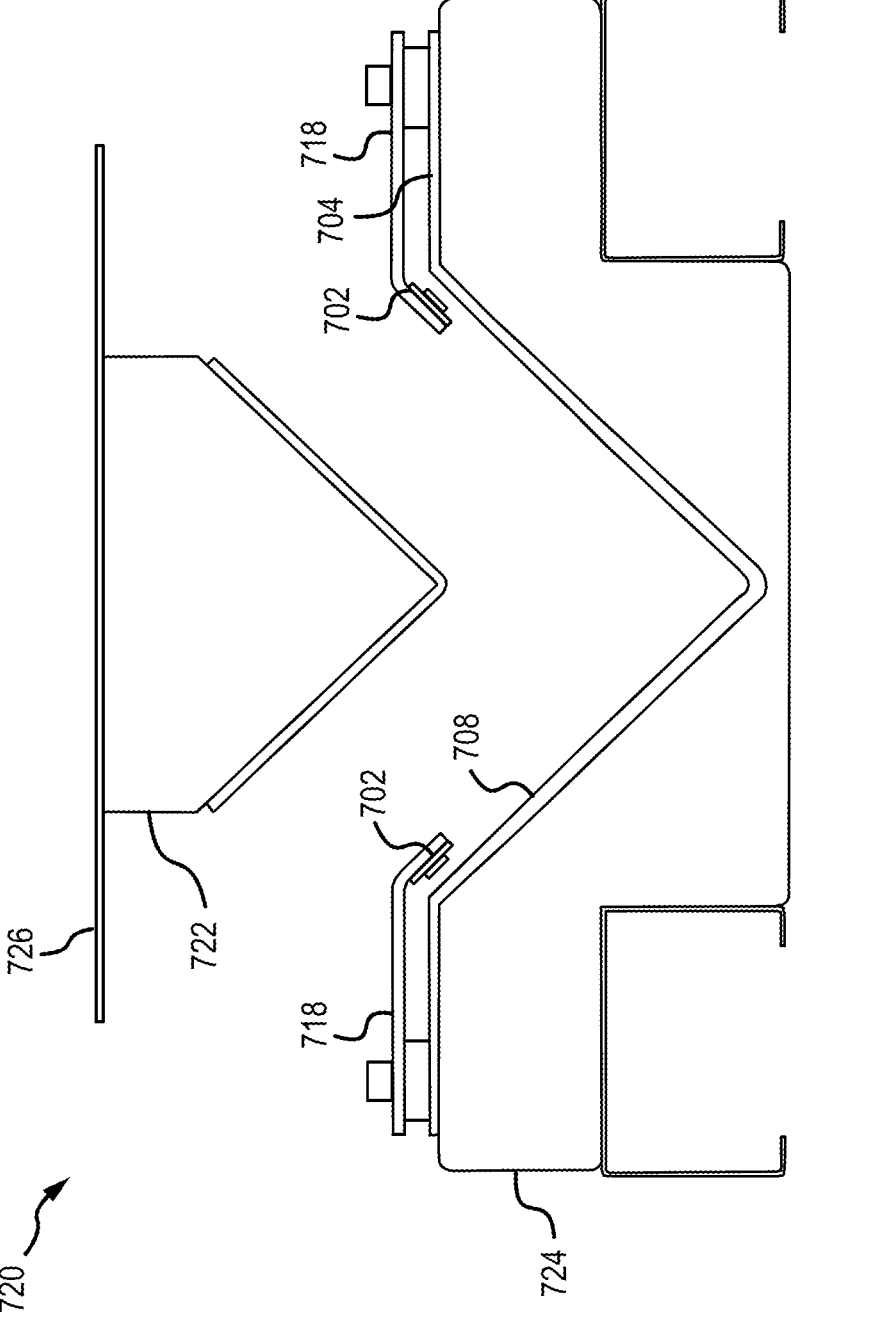
FIG. 11A and FIG. 11B are schematic and perspective illustrations, respectively, of a shape-forming tool comprising grip strips, in accordance with various embodiments.
Figure 11B:
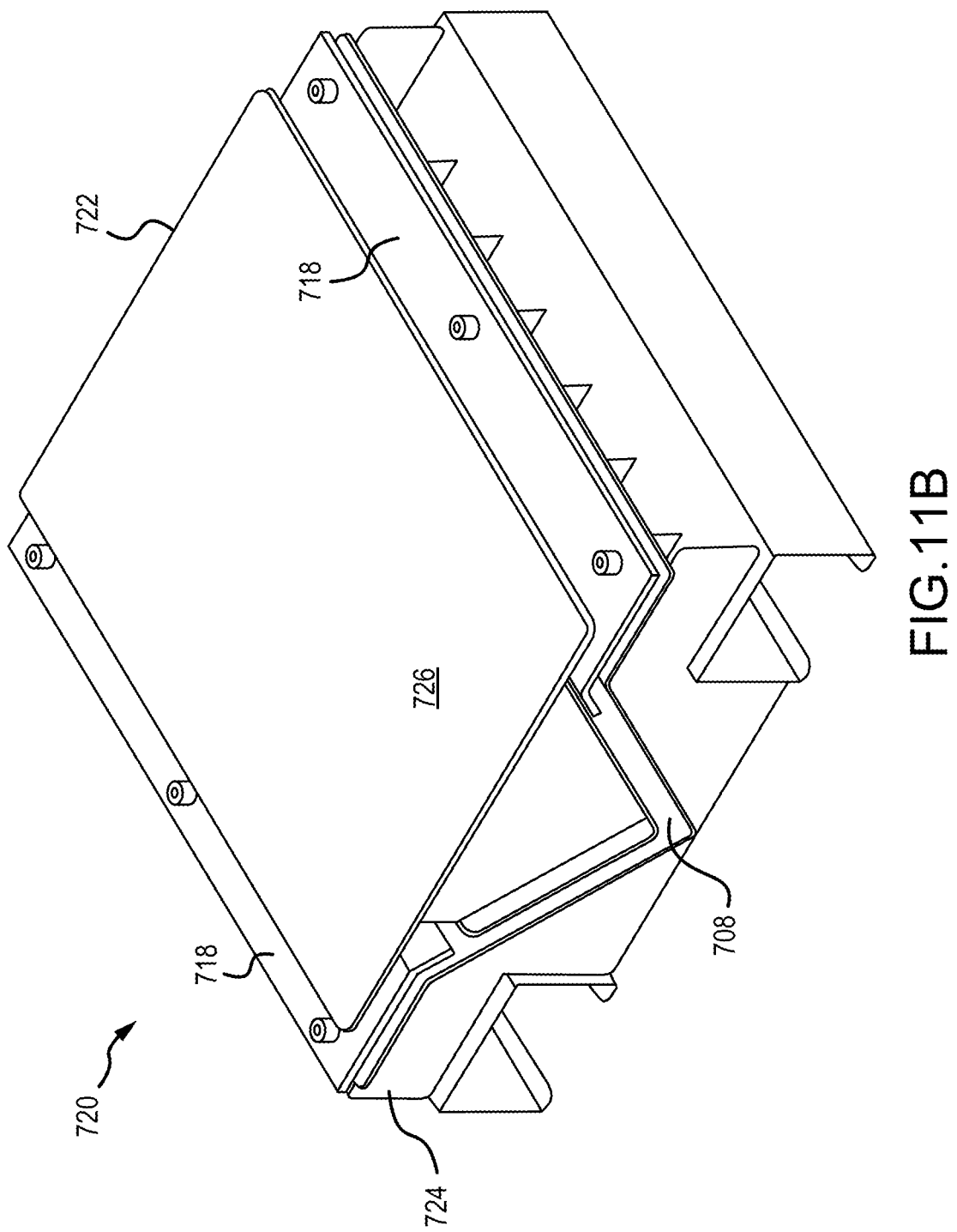

With reference to FIGS. 11A and 11B, a shape-forming tool 720 is illustrated, in accordance with various embodiments. Shape forming tool 720 may be similar to shape forming tool 620 (see FIG. 10A) except that the one or more grip strips 702 are disposed over the die recess 708 instead of the bottom die top surface 704. Moreover, the top die 722 comprises a top plate 726 configured to act as a stop and contact the bottom die 724 to control the preform thickness and fiber volume ratio to the target level. More particularly, top plate 726 may be configured to contact the grip strip support members 718.

The shape forming tool 720 and its components 722, 724 are described above using the terms "bottom" and "top" with reference to exemplary orientations in the drawings. The present disclosure, however, is not limited to any particular formation system orientations. For example, in other embodiments, the top die 722 may alternatively be configured as a bottom die and the bottom die 724 may alternatively be configured as a top die.

Systems and methods are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for manufacturing a C/C part, the method comprising:

heating a female forming tool and a first member to a shape forming temperature of between 65° C. and 205° C., the female forming tool comprising a metal material, the female forming tool comprising a die recess, the female forming tool extends longitudinally along a longitudinal centerline of the female forming tool between and to a first end of the female forming tool and a second end of the female forming tool, the female forming tool extends laterally between and to a first side of the female forming tool and a second side of the female forming tool, the die recess extends vertically into the female forming tool from a first top surface and a second top surface of the female forming tool to a recess surface of the female forming tool, and the first top surface and the second top surface are arranged on opposing sides of the recess surface at a top side of the female forming tool;

positioning an oxidized PAN fiber preform with the female forming tool;

forming the oxidized PAN fiber preform into a shaped body, the forming comprising:

moving the first member at least partially into the die recess, the first member shaped to be complementary to the die recess and comprising a metal material, the oxidized PAN fiber preform disposed between the first member and the female forming tool;

compressing the oxidized PAN fiber preform between the first member and the female forming tool, thereby increasing a fiber volume ratio of the oxidized PAN fiber preform;

bending the oxidized PAN fiber preform over a radii surface of the female forming tool, the radii surface forms a rounded, convex surface transition disposed between a sidewall portion of the recess surface at least partially defining the die recess and the first top surface of the female forming tool; and clamping the oxidized PAN fiber preform directly between a first grip strip and the female forming tool while the oxidized PAN fiber preform is being compressed between the first member and the female forming tool, the first grip strip is located at the first top surface of the female forming tool and disposed along a periphery of the oxidized PAN fiber preform;

removing the shaped body from the female forming tool;

moving the shaped body into a graphite fixture having a contoured shape corresponding to a shape of the die recess of the female forming tool;

performing a carbonization process on the shaped body at a temperature of greater than about 1600° C. while the shaped body is in the graphite fixture;

moving the shaped body into a perforated graphite fixture, the perforated graphite fixture having a contoured shape corresponding to a shape of the die recess of the female forming tool and having a graphite paint disposed on contact surfaces;

depositing carbon on and within the shaped body via a first chemical vapor infiltration process performed at a temperature of between 900° C. to 1100° C. for between about 150 hours and about 650 hours while the shaped body is in the perforated graphite fixture, wherein the contact surfaces are configured to contact the shaped body during the first chemical vapor infiltration process;

performing a heat treat at a temperature of greater than 1600° C.;

performing a second chemical vapor infiltration process on the shaped body; and performing a second heat treat at a temperature of about 1200° C. to about 2600° C.

2. The method of claim 1, further comprising applying at least one of:

a sizing agent to the oxidized PAN fiber preform prior to the oxidized PAN fiber preform being formed into the shaped body;

heat to the oxidized PAN fiber preform for a predetermined duration while the oxidized PAN fiber preform is held in compression in the die recess; or steam to the oxidized PAN fiber preform for a predetermined duration while the oxidized PAN fiber preform is being formed into the shaped body or held in compression in the die recess.

3. The method of claim 1, further comprising:

clamping the oxidized PAN fiber preform directly between a second grip strip and the female forming tool along the periphery of the oxidized PAN fiber preform while the oxidized PAN fiber preform is being compressed between the first member and the female forming tool; and the second grip strip is located at the second top surface of the female forming tool.

4. The method of claim 1, wherein the first member and the female forming tool are in direct contact with the oxidized PAN fiber preform.

5. The method of claim 1, wherein, in response to the forming the oxidized PAN fiber preform into the shaped body, a first portion of the oxidized PAN fiber preform is bent at an angle with respect to a second portion of the oxidized PAN fiber preform.

6. The method of claim 5, wherein the angle is between at least one of:

five degrees and one hundred and seventy-nine degrees; or forty-five and one hundred and thirty-five degrees.

7. The method of claim 1, wherein the oxidized PAN fiber preform comprises a stack of sheets of non-crimp OPF fabric.

8. The method of claim 1, further comprising placing a dead weight onto the graphite fixture so as to hold the shaped body in compression with the graphite fixture during the carbonization process.

9. The method of claim 1, further comprising:

removing the shaped body from the perforated graphite fixture; and machining the shaped body prior to the second chemical vapor infiltration process.

10. The method of claim 9, further comprising machining a surface of the shaped body between the first chemical vapor infiltration process and the second chemical vapor infiltration process.

11. The method of claim 1, further comprising fabricating the oxidized PAN fiber preform from a first sheet of a multi-axial, non-crimp, OPF fabric and a second sheet of the multi-axial, non-crimp, OPF fabric, wherein the first sheet is stacked and needled together with the second sheet to form the oxidized PAN fiber preform.

12. The method of claim 11, wherein the first sheet comprises at least one of a triaxial-tow or a quad-tow, the first sheet comprises a first plurality of fibers extending along a longitudinal direction, a second plurality of fibers oriented at a first angle with respect to the longitudinal direction, and a third plurality of fibers oriented at a second angle with respect to the longitudinal direction, wherein the first angle and the second angle are between twenty degrees and seventy degrees.

13. The method of claim 12, wherein the first angle is equal to the second angle, and the second plurality of fibers intersect the third plurality of fibers in a crisscross pattern.

14. A method for manufacturing a C/C part, the method comprising:

fabricating an oxidized PAN fiber preform comprising a planar stack of sheets of OPF fabric;

heating a female forming tool and a first member to a shape forming temperature of between 65° C. and 205° C., the female forming tool comprising a die recess;

positioning the oxidized PAN fiber preform with the female forming tool;

forming the oxidized PAN fiber preform into a shaped body while the oxidized PAN fiber preform is in the female forming tool, wherein the forming comprises:

moving the first member at least partially into the die recess, the oxidized PAN fiber preform disposed between the first member and the female forming tool;

compressing the oxidized PAN fiber preform between the first member and the female forming tool; and clamping the oxidized PAN fiber preform directly between a first grip strip and the female forming tool while the oxidized PAN fiber preform is being compressed between the first member and the female forming tool, the first grip strip is located at a first top surface of the female forming tool and disposed along a periphery of the oxidized PAN fiber preform;

removing the shaped body from the female forming tool;

moving the shaped body into a graphite fixture having a contoured shape corresponding to a shape of the die recess of the female forming tool and the first member;

performing a carbonization process on the shaped body at a temperature of greater than 1600° C. while the shaped body is in the graphite fixture;

depositing carbon on and within the shaped body via a chemical vapor infiltration process;

performing a heat treat at a temperature of greater than 1600° C.;

performing a second chemical vapor infiltration process on the shaped body; and performing a second heat treat at a temperature of about 1200° C. to about 2600° C.

15. The method of claim 14, wherein the forming further comprises applying a sizing agent to the oxidized PAN fiber preform prior to the oxidized PAN fiber preform being formed into the shaped body, wherein the sizing agent comprises at least one of water, polyvinyl alcohol, modified starch, cellulose gum, carboxymethyl cellulose, modified wax, or acrylates.

16. The method of claim 14, wherein the forming further comprises applying at least one of heat or steam to the oxidized PAN fiber preform for a predetermined duration while the oxidized PAN fiber preform is held in compression in the die recess.

17. The method of claim 16, wherein the forming further comprises placing a dead weight onto the first member to hold the oxidized PAN fiber preform in compression in the die recess for the predetermined duration.

18. The method of claim 17, further comprising decreasing a gap between the first member and a second member with the dead weight during the predetermined duration.

19. The method of claim 1, wherein the second heat treat is performed for between about 4 hours and about 14 hours.

20. The method of claim 1, further comprising:

performing a third chemical vapor infiltration process on the shaped body; and performing a third heat treat on the shaped body.

\* \* \* \* \*